A. F. MASURY.
DISTANCE ROD FOR MOTOR VEHICLES.
APPLICATION FILED JULY 6, 1920.
1,403,513.  Patented Jan. 17, 1922.
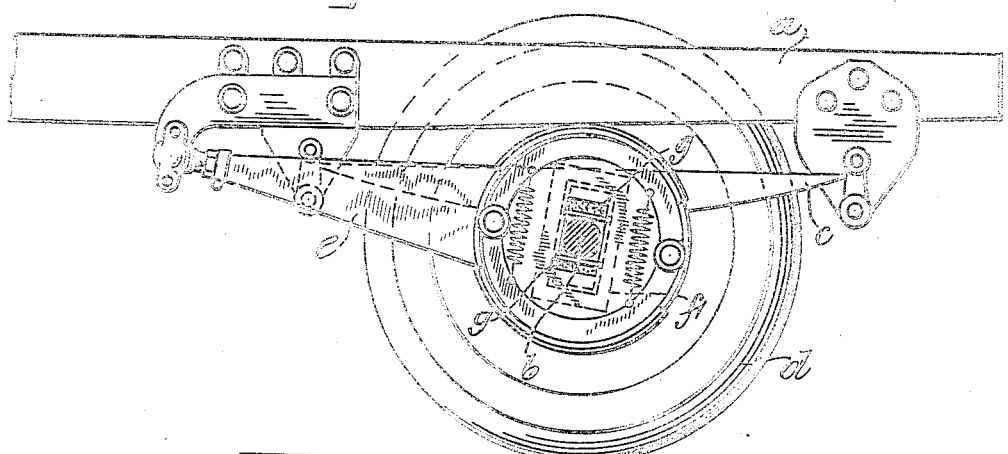
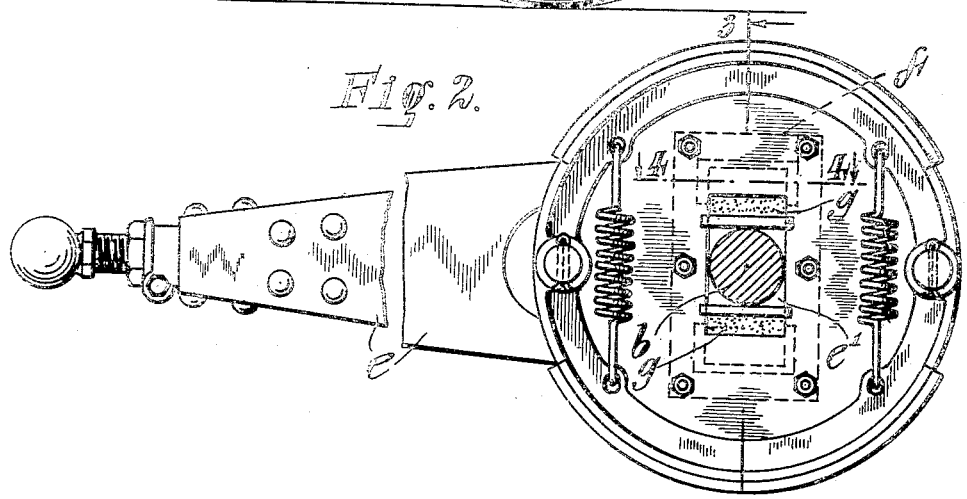
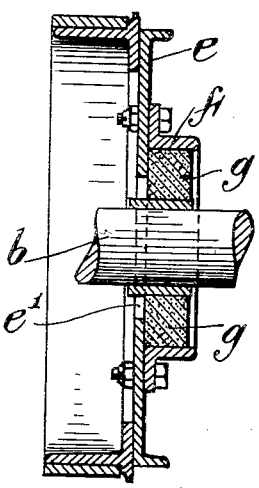
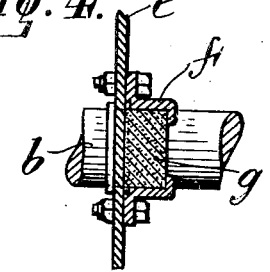

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

DISTANCE ROD FOR MOTOR VEHICLES.

1,403,513. Specification of Letters Patent. Patented Jan. 17, 1922.

Application filed July 6, 1920. Serial No. 394,043.

*To all whom it may concern:*

Be it known that I, ALFRED F. MASURY, a citizen of the United States, residing in the borough of Manhattan of the city of New York, in the State of New York, have invented certain new and useful Improvements in Distance Rods for Motor Vehicles, of which the following is a specification, reference being had to the accompanying drawing forming a part hereof.

In motor vehicle construction and particularly in motor trucks it is sometimes the practise to drive through distance rods operatively engaged with the rear axle and with the vehicle chassis. In such practise it has been usual to form the connection directly between the axle and the distance rod through an interposed bushing engaged immovably with each. By the present construction it is proposed to so engage a distance rod with an axle as to transmit the driving effort directly from the axle to the rod at all times while permitting relative movement between the axle and the rod in planes substantially at right angles to the lines of driving forces in the distance rod. A further object of the invention is to interpose suitable buffers or cushioning elements between the axle and the distance rods in the direction of relative free movement therebetween so as to cushion the movements of the axle with relation to the rod. Still another object is to provide a construction of the character described which shall be simple and inexpensive, readily assembled and free of access for inspection or replacement of the cushioning elements.

Reference is now to be had to the accompanying drawing for a detailed description of one suitable embodiment of the invention, in which—

Figure 1 is a view in elevation of one of the driving wheels of a motor truck showing its relation to the distance rod and side frame member.

Figure 2 is a detail view in elevation and on a somewhat larger scale showing the improved distance rod.

Figures 3 and 4 are detail sectional views taken on the planes indicated by the lines 3—3 and 4—4 of Figure 2, respectively, and looking in the direction of the arrows.

The side frame member $a$ is supported on the axle $b$ through springs $c$ of any suitable form, the axle $b$ having journaled thereon the drive wheels, one of which is shown at $d$. In some types of vehicle construction, and particularly in motor trucks, the driving effort from the traction wheel $d$ is transmitted to the side frame member $a$ from the axle $b$ through a distance rod $e$ of any suitable form. It has been the usual practise to engage the distance rod $e$ directly with the axle, a bushing being usually interposed but directly and immovably engaged with each of the elements. In accordance with the present improvements, it is proposed, no matter what the particular form of the distance rod and no matter what the particular means employed for connecting it operatively with the axle, to provide for relative movement between the axle and the rod in certain planes of movement while engaging the rod directly with the axle for transmission of the driving forces. In carrying out this object in accordance with the illustrated embodiment, the distance rod $e$ at its rear end is provided with an opening $e'$ through which the axle $b$ extends loosely. The distance rod in accordance with the present improvement is intended to be engaged with the axle at opposite sides of the latter in such manner as to transmit the forces for driving ahead and backwards from the axle directly to the distance rod in the proper direction of transmission. On the other hand it is intended that the axle may move with relation to the distance rod in planes generally at right angles to the lines of transmission of such driving forces. In the drawing the distance rod is shown as having secured thereto a generally rectangular frame $f$, the substantially vertical side walls of which are machined and engage the diametrically opposite sides of the axle $b$ with a tangential engagement, so that the driving forces for moving the vehicle backwards or forwards are always transmitted directly from the axle to the distance rod. On the other hand the rectangular frame $f$ is of greater length than the overall size of the axle so that the axle is free to move up and down in the frame in a plane substantially at right angles to the line of transmission of the driving forces. This permits all natural vibrations of the axle and movement thereof under road shocks without imposing the shocks on the distance rod. To cushion these movements of the axle it may be desirable to interpose between it and the distance rod, that is to say, in the illustrated embodiment, between the axle and the ends of the frame *f*, cushioning devices, such as resilient blocks *g* of rubber or other suitable material, or springs. In this manner the vibrations or movements of the axle are cushioned and the distance rod protected against undue shocks.

As pointed out hereinbefore, the connection described between the axle and the distance rod may be effected by the interposition of means other than those herein illustrated and it is to be understood that the claims are not to be interpreted as limited to such specific construction, since a connection of the improved form might be made directly between the axle and the distance rod itself without providing the supplemental frame, or one skilled in the art might devise still other ways of carrying out the inventive thought.

I claim as my invention:

1. In combination with the drive axle of a motor car, a distance rod having an elongated vertical opening to receive the axle, said axle bearing directly against the vertical wall of said opening and exerting a thrust on the rod at right angles to the wall but slidably with respect to the distance rod for the transmission of driving forces thereto while having free relative movement therein in the vertical opening.

2. A distance rod having an elongated opening therein to receive a driving axle, said opening having parallel edges spaced apart to engage the opposite sides of the axle and have the driving thrust impressed thereon at right angles thereto and of a length to permit limited relative movement between the axle and the rod, and compressive cushioning members interposed between the axle and the distance rod to cushion said relative movements.

3. A distance rod having an elongated opening therein to receive an axle, a frame secured to the distance rod and having machined side walls to engage the axle at opposite sides for direct transmission of the driving forces, and cushioning elements carried in the frame in the direction of the elongation thereof to cushion the movements of the axle therein.

This specification signed this 2nd day of July A. D., 1920.

ALFRED F. MASURY.